June 19, 1962 R. L. BRIGHT 3,040,191

SWITCHING SYSTEMS

Filed June 10, 1958

WITNESSES
Leon J. Zaza
James F. Young

INVENTOR
Richard L. Bright
BY [signature]
ATTORNEY

3,040,191
SWITCHING SYSTEMS

Richard L. Bright, Hempfield Township, Westmoreland County, Pa., assignor to Westinghouse Electric Corporation, East Pittsburgh, Pa., a corporation of Pennsylvania Filed June 10, 1958, Ser. No. 741,079
2 Claims. (Cl. 307—88.5)

The invention relates, generally, to switching systems and, more particularly, to switching systems in which hyperconductive negative resistance diodes are utilized as switches.

A semiconductor diode having hyperconductive breakdown is described in a copending application of John Philips, Serial No. 642,743, filed February 27, 1957, now Patent No. 2,953,693, issued September 20, 1960. Such a semiconductor diode may be driven to a highly conductive state in the reverse direction by the application of energy and retained in that state with the expenditure of a small amount of energy.

An object of this invention is to provide for utilizing a negative resistance semiconductor diode as a switch.

A more specific object of the invention is to provide a circuit for turning a hyperconductive negative resistance diode on and off, thereby controlling a direct-current load.

Other objects of the invention will be explained fully hereinafter or will be apparent to those skilled in the art.

In accordance with one embodiment of the invention, a source of direct-current potential, a transformer, a condenser, a rectifier and a hyperconductive negative resistance diode are so connected in a circuit that current through a load may be turned on and off by pulsing the transformer with pulses of opposite polarity.

For a better understanding of the nature and objects of the invention, reference may be had to the following detailed description, taken in conjunction with the accompanying drawing, in which.

Figure 1:
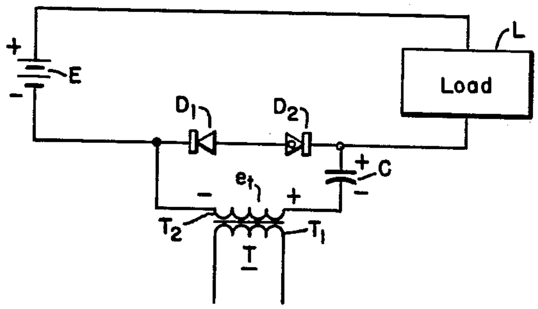
FIGURE 1 is a diagrammatic view of a switching system embodying the principal features of the invention.

Referring to the drawing, and particularly to FIG. 1, the switching system shown therein comprises a source of direct current, which may be a battery E, a load L, a rectifier or diode D1, a hyperconductive negative resistance diode D2, a transformer T having a primary winding T1 and a secondary winding T2, and a condenser C. As shown, the load L is connected across the terminals of the battery E. The diodes D1 and D2 are connected in opposed relation in series-circuit relation wtih the load L. The secondary winding T2 of the transformer T is connected across the diodes D1 and D2 with the condenser C being in series-circuit relation with the secondary winding T2.

The rectifier or diode D1 may be of any one of well-known rectifiers or diodes which have a high resistance to the flow of current in one direction and have a low resistance to the flow of current in the opposite direction. The diode D2 is of the type described in the aforesaid copending application. As described in the copending application, the diode D2 comprises a first base element 12, which consists of a semiconductor member doped with an impurity to provide a first type of semiconductivity, either N or P. Upon the base 12 is an emitter 13 consisting of semiconductor material doped with the opposite type of semiconductivity. The emitter 13 may be prepared by alloying a pellet containing a doping impurity to a wafer of semiconductor material forming the base 12. An emitter junction is present at the zone between base 12 and emitter 13.

In order to facilitate the connecting of the diode into an electrical circuit, a layer 20 of silver or other good conductor metal may be fused, alloyed into, or soldered with the upper surface of emitter 13. Copper conductor wires may be readily soldered to layer 20.

A second base 16 of opposite conductivity is provided next to the first base 12. A zone 17 where bases 12 and 16 meet forms a collector junction.

Next to the second base 16 is a mass of metal 15 which is a source of carriers that play a critcal part in the functioning of the diode. The mass of metal 15 may be neutral or it may have the same doping characteristics as the metal 15. The mass of metal 15 may be applied to the base 16 by soldering, alloying, fusing, or other similar well-known methods.

A base 21 may be provided for mounting the diode when put in use and to conduct current to mass 15. It performs no function in the operation of the diode. The base 21 is preferably made from any of the well-known metals or alloys which readily conduct electrical current. A conductor may be connected to the base 21 in any suitable manner. The base 21 may be attached to the metal mass 15 by brazing or soldering.

Figure 2:
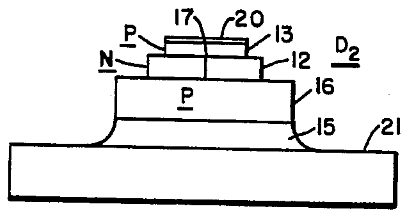
FIG. 2 is an enlarged view, in side elevation, of a hyperconductive negative resistance diode suitable for utilization in the system shown in FIG. 1.
Figure 3:
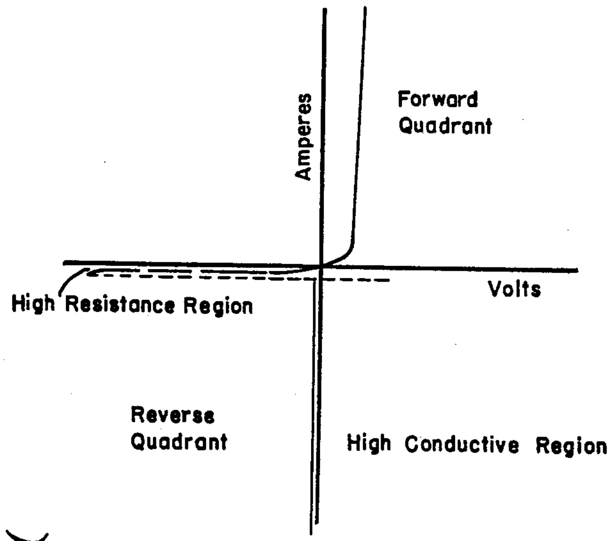
FIG. 3 is a curve showing the characteristics of the diode illustrated in FIG. 2.

The curve shown in FIG. 3 illustrates how the semiconductor diode shown in FIG. 2 responds to the application of different voltages. Considering the upper right or forward quadrant, when a relatively low voltage is applied the current builds up to a relatively high amount. When the voltage is reversed, it builds up in the reverse direction to a relatively high voltage with only a fraction of an ampere of current flowing. When the voltage is increased to the breakdown point the diode suddenly becomes highly conductive and the voltage drops as shown in the lower left or reverse quadrant. The diode becomes a conductor with low ohmic resistance and the current builds up rapidly to a relatively high amount.

As shown in the reverse quadrant, when the diode breaks down the voltage drops along a substantially straight line and very little power is dissipated in maintaining the diode highly conductive. The diode can be rendered highly resistive again by reducing the current below a minimum value and the voltage below breakdown value. Consequently, the curve can be repeatedly followed as desired by improperly controlling the magnitude of reverse current and voltage.

The breakdown or process of the diode becoming highly conductive in the reverse direction occurs within a small interval of time. Investigations have revealed that from the time of subjecting the diode to the necessary voltage in the reverse direction to render it highly conductive to the time when it sustains relatively high current at a low reverse voltage requires an interval of the order of $\frac{1}{10}$ of a microsecond.

In utilizing the semiconductor diode for switching operations in control systems it is good practice to subject it to a constant reverse voltage somewhat below the voltage required to effect breakdown or the rendering of the unit highly conductive. A control voltage which will supplement or add to the constant voltage may then be employed to effect the breakdown. The voltage of the control system will depend on the constant voltage applied, but may be relatively low depending on the conditions to be met. Thus, the switching operations effected by the employment of a control system will not necessitate the interruption of heavy currents or require high voltages.

In the system shown in FIG. 1, the base or constant voltage is supplied by the battery E. The condenser C becomes charged and reaches a steady state voltage $e_c=E$. This is less than the voltage required to break down or saturate the diode D2. If the primary winding T1 of the transformer T is then energized with a pulsating current to provide the polarities shown in the secondary winding T2, then the voltage across D2 is $e_t+E$, which will fire or break down D2. The condenser C then discharges to approximately $e_c=0$. If a pulse of the opposite polarity is applied to the transformer T current is diverted around the diode D2, thereby extinguishing it. The rectifier or diode D1 prevents a pulse through D2 in the forward direction since the two diodes are connected in opposed relation.

In this manner, the current through the load L from the battery E is controlled by applying pulses of the proper polarity to the primary winding T1 of the transformer T. When a pulse of one polarity is applied, the diode D2 becomes highly conductive to permit current to flow through the load circuit. When a pulse of opposite polarity is applied to the transformer, the diode becomes nonconductive, thereby stopping the flow of current through the load L.

From the foregoing description, it is apparent that the invention provides for utilizing a negative resistance semiconductor diode as a switch in a switching system. The operation of the diode may be controlled by applying a pulsating current of the proper polarity to the control transformer.

It will be understood that a device having characteristics similar to those of the diodes D1 and D2 connected in the manner herein illustrated may be controlled in the manner herein described to function as a switch.

Since numerous changes may be made in the above described construction, and different embodiments of the invention may be made without departing from the spirit and scope thereof, it is intended that all matters contained in the foregoing description or shown in the accompanying drawing shall be interpreted as illustrative and not in a limiting sense.

I claim as my invention:

1. In a switching system for connecting a load to a source of direct current, in combination, circuit means for connecting the load across the source, a hyperconductive negative resistance semiconductor and a rectifier connected in said circuit means in opposed series circuit relation, said semiconductor having a predetermined reverse breakdown voltage and having a minimum voltage for retaining the semiconductor in a hyperconductive condition, said direct-current source providing a reverse voltage across said semiconductor less than said predetermined voltage and greater than said minimum voltage, a transformer having a secondary winding connected across said semiconductor and said rectifier, a condenser connected in series circuit relation with said secondary winding, and the primary winding of said transformer being selectively energized by a voltage pulse of one polarity or another and having a value at least equal to the difference between said predetermined voltage and said lesser voltage to control the saturation of said semiconductor thereby controlling the flow of current through said load.

2. In a switching system, in combination, a load, a source of direct current, circuit means for connecting the load across the source, a hyperconductive negative resistance semiconductor having a predetermined reverse breakdown voltage and a minimum voltage for maintaining said semiconductor in a hyperconductive condition, said source providing a voltage across said semiconductor less than said predetermined voltage and greater than said minimum voltage, a rectified connected in said circuit means in opposed series circuit relation with said semiconductor, a transformer having a secondary winding connected across said semiconductor and said rectifier, a condenser connected in series circuit relation with said secondary winding, the primary winding of said transformer being energized by a pulse of one polarity to provide a pulse of one polarity in additive relation with said condenser to fire said semiconductor to permit current to flow through said load, and said primary winding being energized by a pulse of the opposite polarity to divert current from the semiconductor to extinguish said semiconductor and stop the flow of current through said load.

References Cited in the file of this patent

UNITED STATES PATENTS

| | | |
|---|---|---|
| 1,930,758 | Laurent | Oct. 17, 1933 |
| 2,000,685 | Andrews | May 7, 1935 |
| 2,663,767 | Reeves | Dec. 22, 1953 |
| 2,843,765 | Aaigrain | July 15, 1958 |
| 2,905,885 | Burt | Sept. 22, 1959 |
| 2,910,641 | Boyer | Oct. 27, 1959 |
| 2,917,698 | Petrocelli | Dec. 15, 1959 |
| 2,953,693 | Philips | Sept. 20, 1960 |

FOREIGN PATENTS

| | | |
|---|---|---|
| 494,864 | Canada | July 28, 1953 |
| 66,575 | France | Apr. 16, 1957 |